(12) United States Patent
Tochino et al.

(10) Patent No.: US 11,611,470 B2
(45) Date of Patent: Mar. 21, 2023

(54) COMMUNICATION APPARATUS AND COMMUNICATION METHOD

(71) Applicant: NIPPON TELEGRAPH AND TELEPHONE CORPORATION, Tokyo (JP)

(72) Inventors: Takamitsu Tochino, Musashino (JP); Takashi Mitsui, Musashino (JP); Tomoya Hatano, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 20 days.

(21) Appl. No.: 17/258,416

(22) PCT Filed: Jul. 5, 2019

(86) PCT No.: PCT/JP2019/026778
§ 371 (c)(1),
(2) Date: Jan. 6, 2021

(87) PCT Pub. No.: WO2020/013091
PCT Pub. Date: Jan. 16, 2020

(65) Prior Publication Data
US 2021/0297308 A1   Sep. 23, 2021

(30) Foreign Application Priority Data
Jul. 11, 2018   (JP) .............................. JP2018-131517

(51) Int. Cl.
*H04L 41/0654*   (2022.01)
*H04L 12/44*   (2006.01)
(Continued)

(52) U.S. Cl.
CPC .......... *H04L 41/0672* (2013.01); *H04L 12/44* (2013.01); *H04L 41/0686* (2013.01); *H04Q 11/0067* (2013.01); *H04Q 2011/0081* (2013.01)

(58) Field of Classification Search
CPC . H04L 41/0672; H04L 12/44; H04L 41/0686; H04L 41/0654; H04L 41/06;
(Continued)

(56) References Cited

U.S. PATENT DOCUMENTS

| | | | | |
|---|---|---|---|---|
| 2003/0147654 A1* | 8/2003 | Sung | ................... | H04Q 11/0062 398/58 |
| 2011/0293288 A1* | 12/2011 | Ogushi | .............. | H04Q 11/0067 398/154 |
| 2014/0199062 A1* | 7/2014 | In De Betou | .... | H04B 10/25753 398/5 |

FOREIGN PATENT DOCUMENTS

| | | | | |
|---|---|---|---|---|
| CN | 101604997 A | * | 12/2009 | |
| EP | 1387536 A2 | * | 2/2004 | ............. H04L 45/42 |

(Continued)

OTHER PUBLICATIONS

IEEE Standard for Ethernet Section Five, literature, 2015, pp. 310-343, 675-709.

(Continued)

*Primary Examiner* — Vinncelas Louis

(57) ABSTRACT

A communication device including a first communication device and a plurality of second communication devices in an optical access system in which a first communication device and the plurality of second communication devices perform communications with each other under a time division multiple access scheme includes an Ethernet controller configured to implement the communications as Ethernet (registered trademark) communications, and a link failure processing unit configured to output, in response to reception of a link failure notification for notifying occur- (Continued)

rence of a link failure in the communications from the first communication device, a termination instruction to terminate data transmission when the communication device is performing the data transmission to the first communication device, and a start instruction to start the data transmission after recovery from the link failure when the communication device is not performing the data transmission to the first communication device.

8 Claims, 7 Drawing Sheets

(51) Int. Cl.
    *H04L 41/0686*     (2022.01)
    *H04Q 11/00*     (2006.01)

(58) Field of Classification Search
    CPC ............... H04L 45/42; H04Q 11/0067; H04Q 2011/0081; H04Q 2011/0083; H04Q 11/0062; H04B 10/25753

See application file for complete search history.

(56) References Cited

FOREIGN PATENT DOCUMENTS

| JP | H10-290271 | * | 10/1998 | |
|---|---|---|---|---|
| JP | 2012089979 A | * | 5/2012 | |
| JP | 2016046704 A | * | 4/2016 | |
| JP | 6418958 B2 | * | 11/2018 | |
| WO | WO-2006075403 A1 | * | 7/2006 | ............ H04L 41/06 |

OTHER PUBLICATIONS

IEEE Standard for Ethernet Section Four, literature, 2015, pp. 321-323.
IEEE Standard for Ethernet, literature, Sep. 3, 2015.

* cited by examiner

COMMUNICATION APPARATUS AND COMMUNICATION METHOD

CROSS-REFERENCE TO RELATED APPLICATIONS

This application is a 371 U.S. National Phase of International Application No. PCT/JP2019/026778, filed on Jul. 5, 2019, which claims priority to Japanese Application No. 2018-131517 filed on Jul. 11, 2018. The entire disclosures of the above applications are incorporated herein by reference.

TECHNICAL FIELD

The present disclosure relates to a communication device and a communication method.

BACKGROUND ART

Ethernet (registered trademark) is a wired network protocol used worldwide, and is adopted in many standard network devices.

Especially, Ethernet (registered trademark) with its physical layer defined by an optical interface employing an optical transmission technique has been used exclusively for Point-to-Point (P2P) communications, and has been widespread as an interface enabling long-range high-speed communications.

When the above P2P network topology is used in an access network that accommodates a plurality of network devices, especially for performing long-distance transmission in particular, a high installation cost of the optical fiber and a large occupation area of station devices are required. In view of this issue, a Point-to-Multipoint (P2MP) communication system using a Passive Optical Network (PON) topology has been used as a PON system for an access network. In the PON system, an optical fiber and an optical line terminal (OLT) are shared among a plurality of optical network units (ONUs) so that the installation costs of the optical fiber and the occupation area of the OLT can be reduced. This configuration of the PON system has been defined by the Institute of Electrical and Electronics Engineers (IEEE).

In a known PON system, the ONUs execute signal transmission as in the sequence described below, for an uplink communication (communication from the ONUs to the OLT) in communications between the OLT and the ONUs (see Non Patent Literature 1).

FIG. 5 is a block diagram illustrating a network configuration of a general PON system. FIG. 6 is a block diagram illustrating a configuration of a communication system according to a known technique. FIG. 7 is a sequence diagram illustrating a sequence of processing for an uplink communication in the communication system according to the known technique.

FIG. 8 is a flowchart illustrating an example of an operation performed by the OLT in the communication system according to the known technique. FIG. 9 is a flowchart illustrating an example of an operation performed by the ONU in the communication system according to the known technique. The sequence of processing for an uplink communication process in the communication system according to the known technique will be described below with reference to FIGS. 5 to 9.

As illustrated in FIGS. 6, 7 and 9, each of the ONUs transmit a data signal on the basis of a gate message transmitted from a message transmission unit of the OLT.

As illustrated in FIGS. 6, 7 and 8, the message transmission unit of the OLT transmits the gate message. The gate message includes information indicating identifiers of the ONUs that receive the gate message, a transmission start time point, and a transmission permitted time period.

As illustrated in FIGS. 6, 7 and 9, a message processing unit in each ONU associated with the identifiers described in the gate message executes processing on the basis of the transmission start time point and the transmission permitted time period described in the gate message.

The ONU starts transmitting an optical signal when the transmission start time point described in the gate message arrives. Note that in the following description, an idle signal and a data signal are collectively referred to as the "optical signal".

The ONU transmits the optical signal until the transmission permitted time period elapses after the start of the transmission.

The optical signal is transmitted by the connected ONU through the repetition of the processing described above.

CITATION LIST

Non Patent Literature

Non Patent Literature 1: "IEEE Standard for Ethernet SECTION FIVE", IEEE Std 802.3TM-2015", IEEE Computer Society, pp. 310-343, 675-709, 2015

Non Patent Literature 2: "IEEE Standard for Ethernet SECTION FOUR", IEEE Std 802.3TM-2015", IEEE Computer Society, pp. 321-323, 2015

SUMMARY OF THE INVENTION

Technical Problem

In the known technique, Ethernet (registered trademark) in which a physical layer is defined by an optical interface is used for a Point-to-Point (P2P) based long-range high-speed communication or the like. Use of the P2P network topology in an access network involves a risk of an increase in the optical fiber installation costs. Thus, a PON system employing the PON topology for Point-to-MultiPoint (P2MP) has been used for access networks.

In the PON system, a gate message is transmitted from the OLT for an uplink communication between an OLT and an ONU. In the PON system implemented using an Ethernet (registered trademark) device as a general-purpose device, an ONU implemented using a 10 G Ethernet (registered trademark) device in particular may be unable to transmit an L2 data signal when an optical signal is not received by the OLT from the ONU and when the OLT receives the optical signals from a plurality of the ONUs. This is due to a limitation imposed by a link failure detection function, which is an essential standard for 10 G Ethernet (registered trademark). Thus, there is a problem in that the uplink communication cannot be performed.

The present disclosure is made in view of such circumstances, and an object of some aspects of the present disclosure is to provide a technique enabling an uplink communication to be performed using standard Ethernet (registered trademark) devices only in a configuration in which a plurality of network devices are connected by a PON topology.

Means for Solving the Problem

One aspect of the present disclosure is a communication device including a first communication device and a plurality of second communication devices in an optical access system in which the first communication device and the plurality of second communication devices communicate through a time division multiple access scheme, second the communication device including: an Ethernet (registered trademark) controller configured to implement a communication as an Ethernet communication; and a link failure processing unit configured to, when a link failure notification notifying occurrence of a link failure in the communication is received from the first communication device, output a termination instruction on condition that data transmission to the first communication device is happening so as to terminate the data transmission, or output a start instruction on condition that data transmission to the first communication device is not happening so as to start the data transmission after recovery from the link failure.

One aspect of the present disclosure is a communication device described above further including a link failure detection unit configured to detect the recovery from the link failure when the link failure notification is no longer received, in which the link failure processing unit is configured to output the start instruction based on the link failure detection unit detecting the recovery from the link failure.

One aspect of the present disclosure is the communication device described above, in which the link failure notification is a notification signal transmitted from the first communication device to the plurality of second communication devices in accordance with the first communication device detecting the occurrence of the link failure.

One aspect of the present disclosure is a communication method in an optical access system in which a first communication device and a plurality of second communication devices communicate through a time division multiple access method, the communication method performed by a computer of the plurality of second communication devices and including implementing a communications as an Ethernet (registered trademark) communication; and when a link failure notification notifying an occurrence of a link failure in the communication is received from the first communication device, outputting a termination instruction on condition that data transmission to the first communication device is happening so as to terminate the data transmission, or outputting a start instruction on condition that data transmission to the first communication device is not happening so as to start the data transmission after recovery from the link failure.

Effects of the Invention

According to some aspects of the present disclosure, a plurality of network devices can be connected by a PON topology, with the uplink communication being performable using standard Ethernet (registered trademark) devices only.

DESCRIPTION OF EMBODIMENTS

Embodiments

Hereinafter, an embodiment of the present disclosure will be described.

In a PON system, a gate message is transmitted from an OLT for an uplink communication between the OLT and an ONU. When the PON system is implemented using Ethernet (registered trademark) devices, which are general-purpose devices, an ONU implemented using a 10G Ethernet (registered trademark) device might be unable to transmit an L2 data signal in the uplink communication due to a limitation imposed by a link failure detection function that is a required standard of 10G Ethernet (registered trademark).

In the embodiments described below, the OLT always transmits the gate message to one of the ONUs before detecting the link failure, and the other one of the ONUs in L2 data communications quenches the optical signal. As a result, uplink signals transmitted from the respective ones of the plurality of ONUs do not collide, and recovery from the link failure is achieved. Thus, the transmission of the data signal by the ONU that has received the gate message is enabled.

With the above-described configuration of the communication system according to the embodiment, a plurality of network devices can be connected by a PON topology, with the uplink communication being performable using standard Ethernet (registered trademark) devices only. Hereinafter, the communication system 1 according to the embodiment of the present disclosure will be described with reference to the drawings.

Functional Configuration of Communication System

Figure 1:
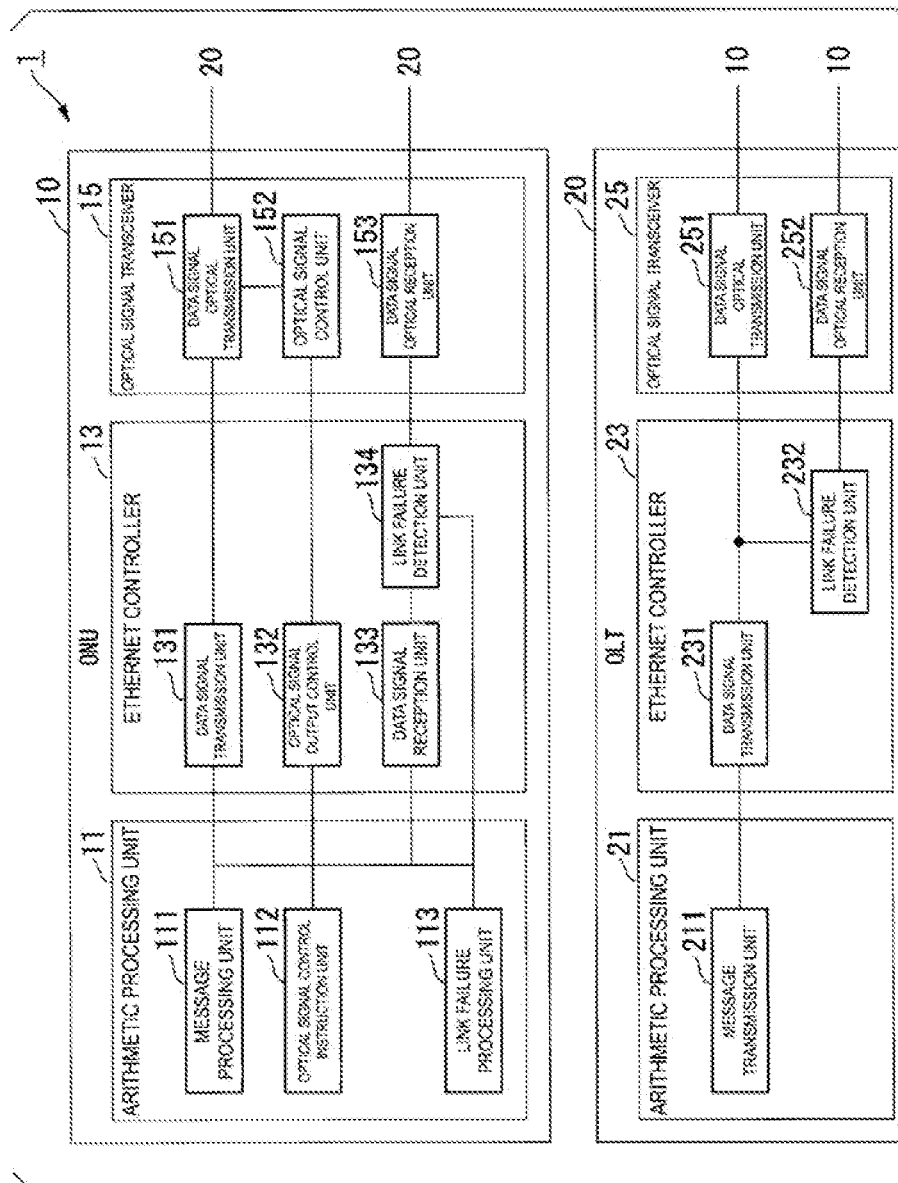
FIG. 1 is a block diagram illustrating a functional configuration of a communication system 1 according to an embodiment of the present disclosure.

FIG. 1 is a diagram illustrating a functional configuration of the communication system 1 according to an embodiment of the present disclosure. As illustrated in FIG. 1, the communication system 1 is configured to include ONUs 10 and an OLT 20. The communication system 1 is an optical access system in which the OLT 20 (first communication device) and the ONUs 10 (second communication devices) communicate with each other under a time division multiple access scheme.

The ONU 10 is configured to include an arithmetic processing unit 11, an Ethernet controller 13, and an optical signal transceiver 15.

The arithmetic processing unit 11 is configured to include a processor such as a Central Processing Unit (CPU) for example. As illustrated in FIG. 1, the arithmetic processing unit 11 is configured to include a message processing unit 111, an optical signal control instruction unit 112, and a link failure processing unit 113.

The message processing unit 111, the optical signal control instruction unit 112, and the link failure processing unit 113 are software programs executed by a processor such as a CPU.

The message processing unit 111 outputs a control start instruction and a control termination instruction to the optical signal control instruction unit 112.

The message processing unit 111 executes transmission processing for data transmitted from the request source and is waiting to be transmitted (hereinafter referred to as "transmission standby data"). Note that the transmission standby data is stored in a temporary storage medium (not illustrated) provided by the arithmetic processing unit 11 or another functional block of the ONU 10. The message processing unit 111 outputs to a data signal optical transmission unit 151 of the optical signal transceiver 15 via a data signal transmission unit 131 of the Ethernet controller 13.

When the control start instruction is input, the optical signal control instruction unit 112 outputs an optical signal control instruction to an optical signal output control unit 132 of the Ethernet controller 13, to cause control to be executed for optical signal output Upon receiving a link failure notification transmitted from the OLT 20, the link failure processing unit 113 outputs an instruction (termination instruction) for terminating the optical signal output, to the optical signal control instruction unit 112, when the ONU 10 is performing data transmission corresponding to the immediately preceding signal transmission. Upon receiving the link failure notification transmitted from the OLT 20, the link failure processing unit 113 waits for the recovery from the link failure, when the ONU 10 is not performing the data transmission corresponding to the immediately preceding signal transmission. Then, after the communication system 1 has recovered from the link failure, the link failure processing unit 113 outputs the instruction (start instruction) to the data signal transmission unit 131 for causing the data signal transmission unit 131 to start the signal transmission.

The Ethernet controller 13 is a circuit implementing the communications as Ethernet (registered trademark) communications in particular, among circuits that enable data communications under Media Access Control (MAC) layer and physical (PHY) layer protocols and are installed in a network interface and a network device, for example. As illustrated in FIG. 1, the Ethernet controller 13 is configured to include the data signal transmission unit 131, the optical signal output control unit 132, a data signal reception unit 133, and a link failure detection unit 134.

The data signal transmission unit 131 outputs an electrical signal based on the data signal input from the message processing unit 111, to the data signal optical transmission unit 151. Here, the optical signal output control unit 132 controls an optical signal control unit 152 on the basis of the electrical signal output from the data signal transmission unit 131 to the data signal optical transmission unit 151, to control the output of the optical signal transmitted from the data signal light transmission unit 151.

The data signal reception unit 133 acquires an electrical signal based on the optical signal received by a data signal optical reception unit 153 from the link failure detection unit 134, and outputs a data signal based on the acquired electrical signal to the message processing unit 111.

The link failure detection unit 134 acquires an electrical signal based on the optical signal received by the data signal optical reception unit 153, and detects the presence or absence of the link failure notification. The link failure detection unit 134 outputs the acquired link failure notification to the link failure processing unit 113.

The link failure detection unit 134 outputs a data signal based on the acquired electrical signal to the data signal reception unit 133.

The optical signal transceiver 15 is a device having a physical medium dependent unit function that can output an electrical signal as an optical signal. Specifically, the optical signal transceiver 15 is, for example, an optical module such as a Small Form-factor Pluggable (SFP) (Mini-GBIC)/SFP+, or an optical module mounted on a printed circuit board. As illustrated in FIG. 1, the optical signal transceiver 15 is configured to include the data signal optical transmission unit 151, the optical signal control unit 152, and the data signal optical reception unit 153.

Under the control by the optical signal control unit 152, the data signal optical transmission unit 151 transmits an optical signal based on the electrical signal input from the data signal transmission unit 131, to the OLT 20 via the network.

Under the control by the optical signal output control unit 132, the optical signal control unit 152 switches ON/OFF an optical pulse on the basis of the values (0 and 1) of the electrical signal input to the data signal optical transmission unit 151. Thus, an optical signal is transmitted to the OLT 20. With the configuration described above, the ONU 10 can transmit the data signal to the OLT 20 as an optical burst signal without using an optical line termination device.

The data signal optical reception unit 153 receives the optical signal transmitted from the OLT 20. The data signal optical reception unit 153 outputs an electrical signal based on the received optical signal, to the link failure detection unit 134.

The OLT 20 is configured to include an arithmetic processing unit 21, an Ethernet controller 23, and an optical signal transceiver 25.

The arithmetic processing unit 21 is configured to include a processor such as a CPU for example. As illustrated in FIG. 1, the arithmetic processing unit 21 is configured to include a message transmission unit 211.

The message transmission unit 211 executes transmission processing for data transmitted from the request source and in transmission standby. Note that the transmission standby data is stored in a temporary storage medium (not illustrated) included in the arithmetic processing unit 21 or another functional block of the OLT 20.

The message transmission unit 211 outputs, to a data signal optical transmission unit 251 of the optical signal transceiver 25 via a data signal transmission unit 231 of the Ethernet controller 23, a data signal transmission instruction to cause transmission of a data signal and the data for which the transmission processing is executed.

The Ethernet controller 23 is a circuit implementing the communications as Ethernet (registered trademark) communications in particular, among circuits that enable data communications under MAC layer and physical (PHY) layer protocols, and are installed in a network interface and a network device, for example. As illustrated in FIG. 1, the Ethernet controller 23 is configured to include the data signal transmission unit 231 and a link failure detection unit 232.

The data signal transmission unit 231 outputs an electrical signal based on the data signal input from the message transmission unit 211, to the data signal optical transmission unit 251. The link failure detection unit 232 acquires an electrical signal based on the optical signal received by the data signal optical reception unit 252, and detects the presence or absence of link failure.

The optical signal transceiver 25 is a device having a physical medium dependent unit function that can output an electrical signal as an optical signal. Specifically, the optical signal transceiver 25 is, for example, an optical module such as an SFP/SFP+, or an optical module mounted on a printed circuit board. As illustrated in FIG. 1, the optical signal transceiver 25 is configured to include the data signal optical transmission unit 251 and the data signal optical reception unit 252.

The data signal optical transmission unit 251 transmits an optical signal based on the electrical signal input from the data signal transmission unit 231, to the ONU 10 via the network. The data signal optical reception unit 252 receives the optical signal transmitted from the OLT 10. The data signal optical reception unit 252 outputs an electrical signal based on the received optical signal, to the link failure detection unit 232.

With the configuration described above, the OLT 20 performs control on the ONU 10 to permit the ONU 10 to perform signal transmission to the OLT 20 (hereinafter referred to as "signal transmission permission").

Hereinafter, a process of control processing in which the OLT 20 permits signal transmission by the ONU 10 will be described with reference to FIGS. 2 to 4.

Figure 2:
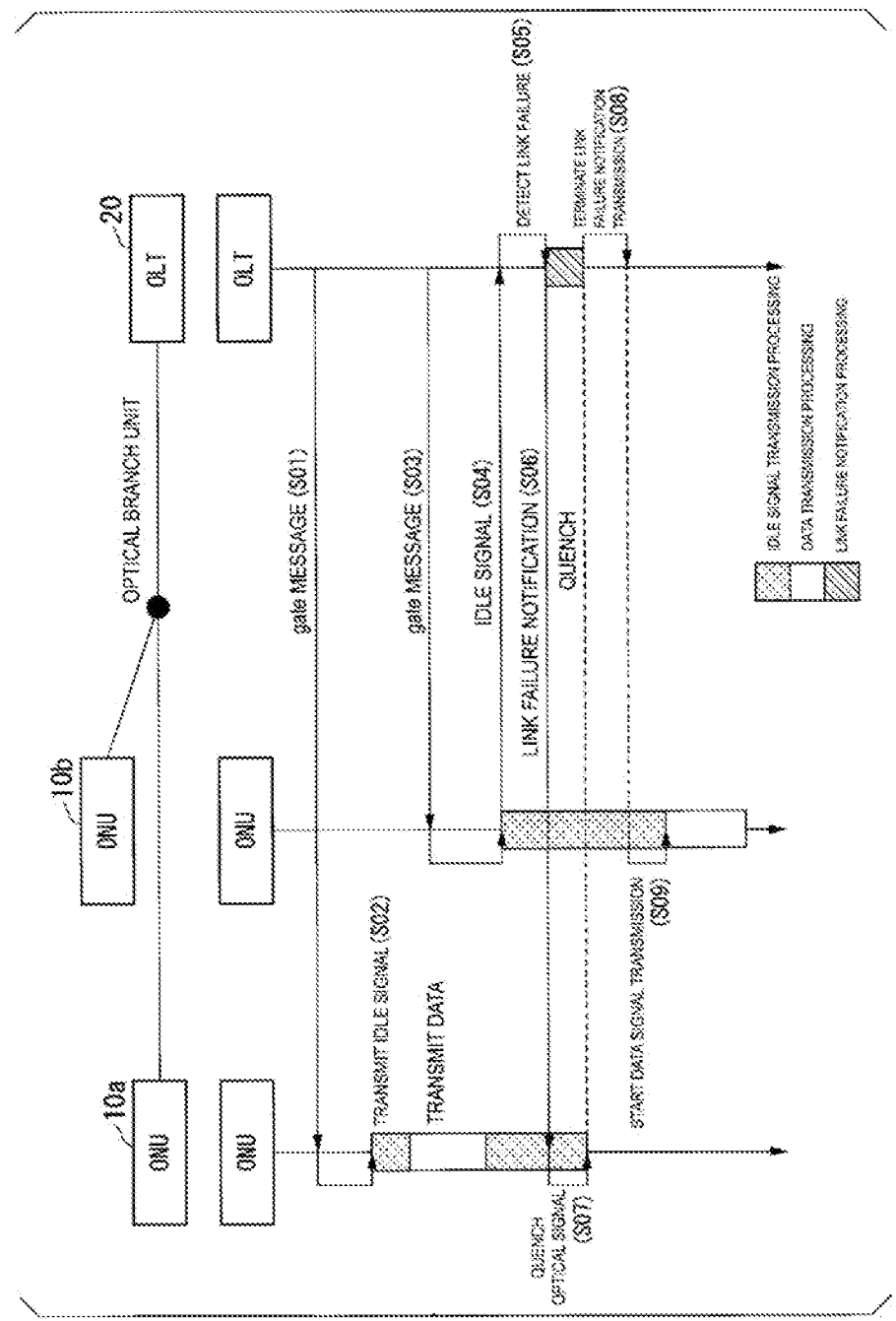
FIG. 2 is a sequence diagram illustrating a sequence of control processing for signal transmission permission executed by the communication system 1 according to an embodiment of the present disclosure.

FIG. 2 is a sequence diagram illustrating a sequence of control processing for the signal transmission permission executed by the communication system 1 according to an embodiment of the present disclosure.

Note that the following description is given on a process of control processing for signal transmission permission performed when, in a state where one of the ONUs 10 (ONU 10a) is transmitting an optical signal, the other one of the ONUs 10 (the ONU 10b that is an ONU different from the ONU 10a) transmits an optical signal to the OLT 20.

The OLT 20 transmits the gate message to the ONU 10a (step S01). As a result, transmission of the optical signal (the idle signal and the data signal) from the ONU 10a to the OLT 20 starts (step S02).

The OLT 20 transmits the gate message to the ONU 10b while being in a state of receiving an optical signal from the ONU 10a (step S03).

The ONU 10b receives the gate message transmitted from the OLT 20. The ONU 10b starts transmitting the optical signal to the OLT 20 when the transmission start time point based on information included in the received gate message arrives (step S04).

With the ONU 10a and the ONU 10b transmitting signals to the OLT 20, the OLT 20 receives optical signals from two ONUs (the ONU 10a and the ONU 10b). As a result, the OLT 20 detects a link failure (step S05).

The OLT 20 that has detected the link failure starts broadcasting the link failure notification (step S06).

The link failure processing units 113 of the ONU 10a and the ONU 10b the have received the link failure notification transmitted from the OLT 20 execute the following processing.

The ONU 10a in a state of performing data transmission corresponding to the immediately preceding signal transmission terminates the data transmission. In other words, the ONU 10a quenches the optical signal (step S07).

The ONU 10b in a state of not performing the data transmission corresponding to the immediately preceding signal transmission waits for the recovery from the link failure.

The OLT 20 recovered from the link failure by the termination of the signal transmission by the ONU 10a (quenching of the optical signal) terminates the broadcasting of the link failure notification (step S08).

The ONU 10b recognizes the recovery from the link failure when the link failure notification is no longer received, and starts transmitting the data signal to the OLT 20 (step S09).

The control processing executed through the sequence described above ensures that the OLT 20 transmits the gate message to the ONUs 10 before the OLT 20 detects the link failure. Thus, the OLT 20 can perform the signal transmission permission control on the ONUs 10.

Operation Performed by OLT

An example of an operation performed by the OLT 20 in the above sequence will be described below.

Figure 3:
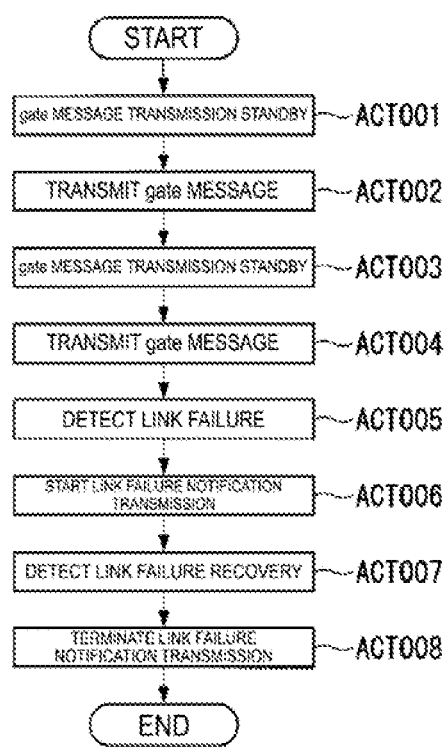
FIG. 3 is a flowchart illustrating an operation performed by an OLT 20 of the communication system 1 according to an embodiment of the present disclosure.

FIG. 3 is a flowchart illustrating an operation performed by the OLT 20 of the communication system 1 according to an embodiment of the present disclosure.

The OLT 20 enters a gate message transmission standby state (ACT001).

The OLT 20 transmits the gate message to the ONU 10a (ACT002).

The OLT 20 enters the gate message transmission standby state (ACT003).

The OLT 20 transmits the gate message to the ONU 10b while being in a state of receiving an optical signal from the ONU 10a (ACT004).

The OLT 20 detects a link failure due to simultaneous reception of optical signals from a plurality of ONUs (the ONU 10a and the ONU 10b) (ACT005).

The OLT 20 starts broadcasting the link failure notification (ACT006).

The OLT 20 detects recovery from the link failure based on the termination of the signal transmission by the ONU 10a (ACT007).

The OLT 20 terminates the broadcasting of the link failure notification (ACT008). Then, the processing in the flowchart illustrated in FIG. 3 ends.

Operation Performed by ONU

An example of an operation performed by the ONU 10 in the above sequence will be described below.

Figure 4:
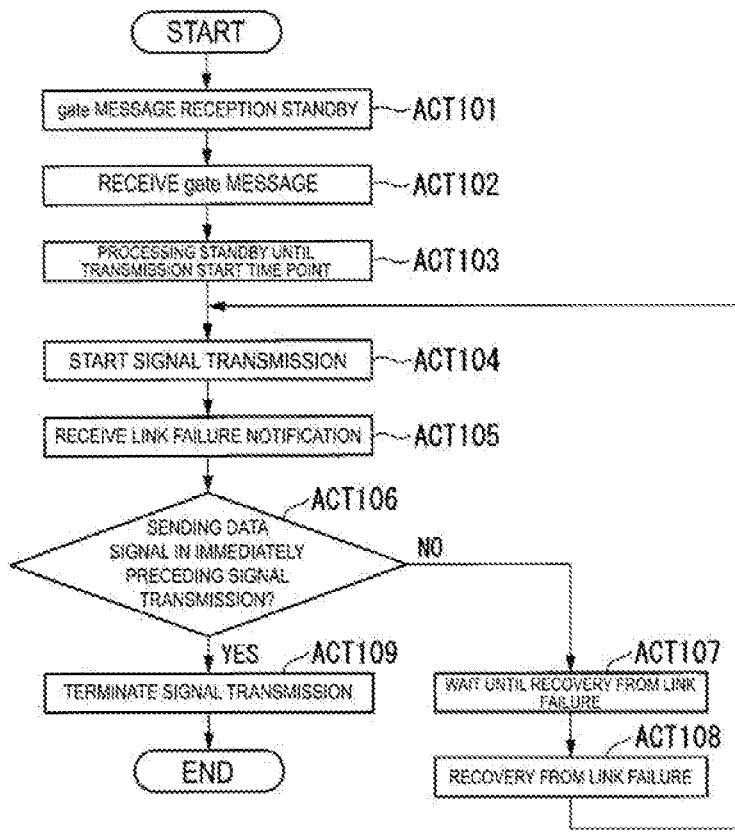
FIG. 4 is a flowchart illustrating an operation performed by an ONU 10b of the communication system 1 according to an embodiment of the present disclosure.
Figure 5:
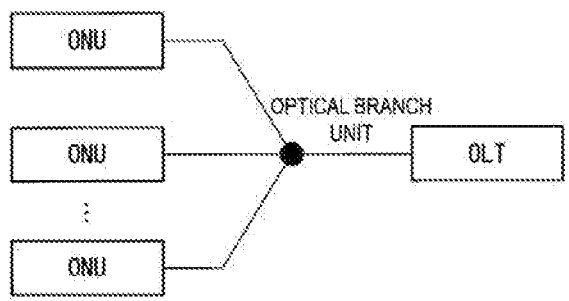
FIG. 5 is a block diagram illustrating a network configuration of a general PON system.
Figure 6:
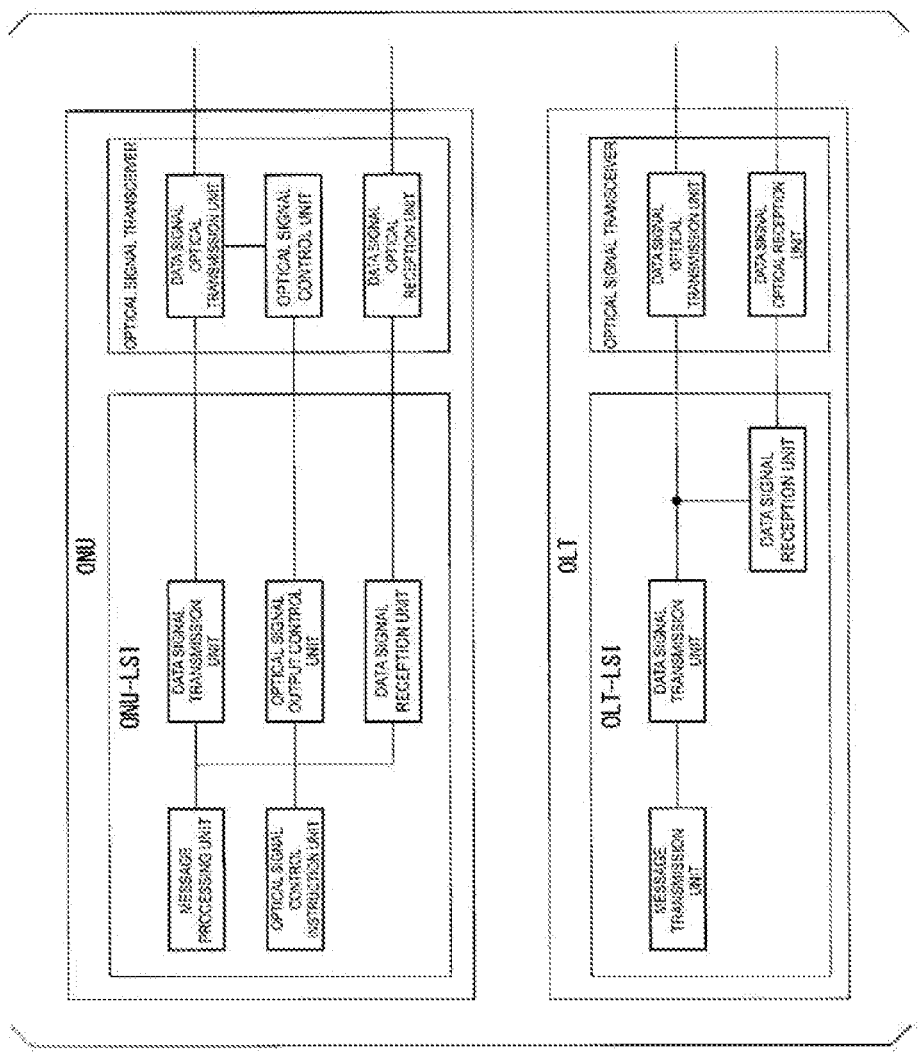
FIG. 6 is a block diagram illustrating a configuration of a communication system according to a known technique.
Figure 7:
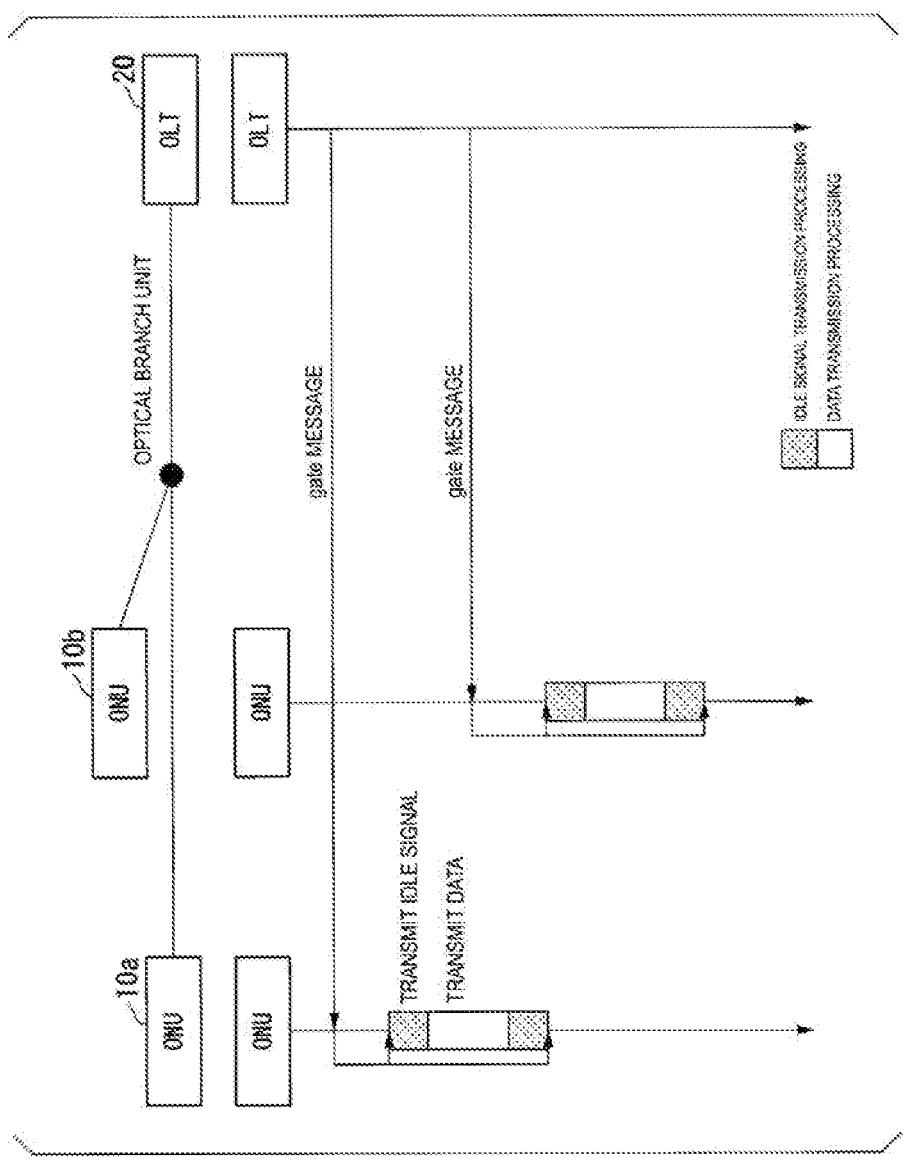
FIG. 7 is a sequence diagram illustrating a sequence of processing for an uplink communication in the communication system according to the known technique.
Figure 8:
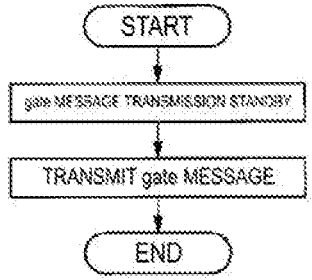
FIG. 8 is a flowchart illustrating an example of an operation performed by an OLT in the communication system according to the known technique.
Figure 9:
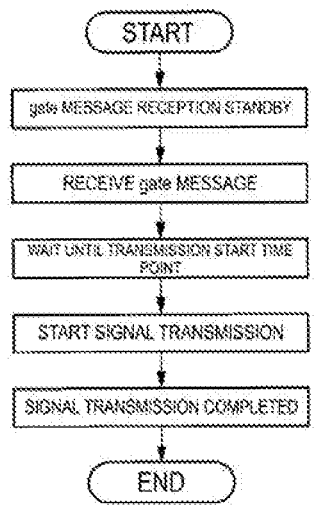
FIG. 9 is a flowchart illustrating an example of an operation performed by an ONU in the communication system according to the known technique.

FIG. 4 is a flowchart illustrating an operation performed by the ONU 10 of the communication system 1 according to an embodiment of the present disclosure.

The ONU 10 enters a state of waiting for the reception of the gate message transmitted from the OLT 20 (ACT101).

The ONU 10 receives the gate message transmitted from the OLT 20 (ACT102).

The ONU 10 waits until the transmission start time point, based on the information included in the gate message received, arrives, before executing processing of signal transmission (ACT103).

The ONU 10 starts the processing of signal transmission to the OLT 20 when the transmission start time point arrives (ACT104).

The ONU 10 receives a link failure notification broadcast from the OLT 20 (ACT105). When the ONU 10 is not transmitting the data signal to the OLT 20 in the immediately preceding signal transmission (No in ACT106), the ONU 10 waits for the recovery from the link failure (ACT108).

The ONU 10 recognizes the recovery from the link failure when the link failure notification broadcast from the OLT 20 is no longer received (ACT109), and starts the processing of signal transmission to the OLT 20 (ACT104).

When the ONU 10 is transmitting the data signal to the OLT 20 in the immediately preceding signal transmission in ACT106 described above (Yes in ACT106), the ONU 10 terminates the signal transmission (ACT107).

Then, the processing in the flowchart illustrated in FIG. 4 ends.

As described above, the communication system 1 according to an embodiment of the present disclosure is an optical access system in which the OLT 20 (first communication device) and the plurality of ONUs 10 (second communication devices) communicate with each other under a time division multiple access scheme. The ONU 10 includes the Ethernet controller 13 configured to implement Ethernet (registered trademark) communications. The ONU 10 further includes the link failure processing unit configured to, when the link failure notification indicating the occurrence of a link failure in the communications from the OLT 20 is received, output an instruction (termination instruction) on condition that the ONU 10 is performing data transmission to the OLT 20 so as to terminate the data transmission to the OLT 20 or output the instruction (start instruction) on condition that the ONU 10 is not performing the data transmission to the OLT 20 so as to start the data transmission after the recovery from the link failure.

The ONU 10 further includes the link failure detection unit 134 configured to detect recovery from the link failure based on the link failure notification being no longer received. The link failure processing unit 113 outputs the start instruction based on the detection of the recovery from the link failure by the link failure detection unit 134.

The link failure is a communication failure occurring due to the OLT 10 simultaneously receiving optical signals transmitted from the respective ones of the plurality of ONUs 10. The link failure notification is a notification signal transmitted from the OLT 20 to the plurality of ONUs 10 in accordance with the detection of the occurrence of the link failure by the OLT 20.

With the ONU 10 according to the embodiment of the present disclosure having the configuration described above, an uplink communication can be performed using standard Ethernet (registered trademark) devices only in a configuration in which a plurality of network devices (ONUs 10) are connected by a PON topology.

The embodiments of the present disclosure have been described above in detail with reference to the drawings. However, specific configurations are not limited to those embodiments, and include any design or the like within the scope not departing from the gist of the present disclosure.

Note that, for the sake of easier understanding of the features of the present disclosure, in the description above, explanation of the configurations related to the processing of receiving the data signal based on the optical signal received from the ONU by the OLT 20 (a data signal reception unit of the Ethernet controller 23 and a message reception unit of the arithmetic processing unit 21) is omitted. Still, the communication system 1 according to the embodiments described above is a general network system in which the ONUs 10 and the OLT 20 are connected to each other by the PON topology, and thus obviously the communication from the ONU 10 side to the OLT 20 can be performed.

Note that a part or all of the ONUs 10 and the OLT 20 according to the embodiments described above may be realized by a computer. In that case, this configuration may be enabled by recording a program for implementing such control functions on a computer-readable recording medium and causing a computer system to read the program recorded on the recording medium for execution.

Note that it is assumed that the "computer system" mentioned here refers to a computer system built into the ONUs 10 and the OLT 20, and the computer system includes an OS and hardware components such as a peripheral apparatus. The "computer-readable recording medium" refers to a portable medium such as a flexible disk, a magneto-optical disk, a ROM, and a CD-ROM, and a storage apparatus such as a hard disk installed in a computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a certain period of time, such as a volatile memory within the computer system for functioning as a server or a client in such a case. Furthermore, the program may be configured to realize some of the functions described above, and also may be configured to be capable of implementing the functions described above in combination with a program already recorded in the computer system.

A part or all of the ONUs 10 and the OLT 20 in the embodiments described above may be realized as an integrated circuit such as a Large Scale Integration (LSI). Each function block of the ONUs 10 and the OLT 20 may be individually realized as processors, or a part or all thereof may be integrated into a processor. Furthermore, a circuit integration technique is not limited to the LSI, and a part of or all of the ONUs 10 and the OLT 20 may be realized with a dedicated circuit or a general-purpose processor. In a case that with advances in semiconductor technology, a circuit integration technology with which an LSI is replaced appears, an integrated circuit based on the technology may be used.

REFERENCE SIGNS LIST

1 . . . Communication system
10 . . . Optical network unit (ONU)
11 . . . Arithmetic processing unit
13 . . . Ethernet controller
15 . . . Optical signal transceiver
20 . . . Optical line terminal (OLT)
21 . . . Arithmetic processing unit
23 . . . Ethernet controller
25 . . . Optical signal transceiver
111 . . . Message processing unit
112 . . . Optical signal control instruction unit
113 . . . Link failure processing unit
131 . . . Data signal transmission unit
132 . . . Optical signal output control unit
133 . . . Data signal reception unit
134 . . . Link failure detection unit
151 . . . Data signal optical transmission unit
152 . . . Optical signal control unit
153 . . . Data signal optical reception unit
211 . . . Message transmission unit
231 . . . Data signal transmission unit
232 . . . Link failure detection unit
251 . . . Data signal optical transmission unit
252 . . . Data signal optical reception unit

The invention claimed is:

1. A communication device comprising a first communication device and a plurality of second communication devices in an optical access system in which the first communication device and the plurality of second communication devices communicate through a time division multiple access scheme, the second communication device comprising:

an Ethernet (registered trademark) controller configured to implement a communication as an Ethernet (registered trademark) communication; and a link failure processing unit configured to:

verify whether or not data transmission to the first communication is happening;

when a link failure notification notifying occurrence of a link failure in the communication is received from the first communication device, output a termination instruction in response to verifying that the data transmission to the first communication device is happening so as to terminate the data transmission; and output a start instruction after recovery from the link failure in response to verifying that the data transmission to the first communication device is not happening so as to start the data transmission.

2. The communication device according to claim 1, further comprising a link failure detection unit configured to detect the recovery from the link failure when the link failure notification is no longer received, wherein the link failure processing unit is configured to output the start instruction based on the link failure detection unit detecting the recovery from the link failure.

3. The communication device according to claim 1, wherein the link failure notification is a notification signal transmitted from the first communication device to the plurality of second communication devices in accordance with the first communication device detecting the occurrence of the link failure.

4. The communication device of claim 1 wherein the first communication device and the plurality of second communication devices communicate via a passive optical network (PON).

5. The communication device of claim 1 wherein the Ethernet communication is 10G Ethernet communication.

6. The communication device of claim 1 wherein the first communication device is an optical line terminal (OLT) and the second communication devices are optical network units (ONUS).

7. The communication device of claim 1 wherein the Ethernet controller is configured to perform data communications under media access control (MAC) layer and physical layer (PHY) layer protocols.

8. A communication method in an optical access system in which a first communication device and a plurality of second communication devices communicate through a time division multiple access method, the communication method performed by a computer of the plurality of second communication devices and comprising:

implementing a communication as an Ethernet (registered trademark) communication;

verify whether or not data transmission to the first communication is happening; and when a link failure notification notifying an occurrence of a link failure in the communication is received from the first communication device, outputting a termination instruction in response to verifying that the data transmission to the first communication device is happening so as to terminate the data transmission; and outputting a start instruction after recovery from the link failure in response to verifying that the data transmission to the first communication device is not happening so as to start the data transmission.

* * * * *